UNITED STATES PATENT OFFICE.

MARC. W. BEYLIKGY, OF NEW YORK, N. Y.

MANUFACTURE OF HYDROFLUOSILICIC ACID.

SPECIFICATION forming part of Letters Patent No. 465,607, dated December 22, 1891.

Application filed March 13, 1891. Serial No. 384,857. (No specimens.)

*To all whom it may concern:*

Be it known that I, MARC. W. BEYLIKGY, of the city and county of New York, in the State of New York, have invented a new and useful Improvement in the Manufacture of Hydrofluosilicic Acid, of which the following is a full and exact specification.

According to chemical theory, hydrofluosilicic acid is the result of the partial decomposition of the gas called "fluoride of silicon" under the action of a large quantity of water at ordinary temperature. The reaction requires three molecules of the gas, of which only one undergoes decomposition to be transformed into silicic and fluorhydric acids on assimilating the elements of two molecules of water, and while the latter acid recombines with two molecules of fluoride of silicon to constitute hydrofluosilicic acid the silicic acid set free is eliminated from the sphere of reaction, as illustrated by the following equation:

The stability of free hydrofluosilicic acid can only be secured through diffusion out of a large bulk of water, so that the concentration reverses the reaction, the acid being resolved again into fluoride of silicon and fluorhydric acid.

The decomposition of binary or haloid compounds like fluorides by oxygenated acids is effected in consequence of decomposition of water, the combining elements of which supply the required hydrogen and oxygen for the formation of new compounds; and whereas the temperature at which the reaction is maintained is higher than that of the boiling-point of water the fixity of the latter at higher temperature is secured by the agency of free sulphuric acid.

The economy realized by using weak sulphuric acid cannot operate with hydrofluosilicic acid as it does with hydrochloric acid, owing to the prejudicial presence of moisture in the fluoride of silicon, which, as hereinbefore explained, reversed reactions constantly reciprocating with each other, would render the operation very irregular. This explains the customary employment of nearly five times as much sulphuric acid as the equivalence of fluor-spar under operation should require.

To effect the decomposition of the fluorides without the intervention of free acids and divide the stages of transformation of the elements into hydrofluosilicic acid are two distinctive particularities of this improved process of manufacturing the said acid, of which the following is the description: Seven parts, in weight, of ground commercial copperas (crystallized protosulphate of iron) is subjected to oxidation by the process of torrefying in open air, whereby the protosulphate is converted into persulphate, rendered basic by the excess of peroxide of iron formed at the same time. The sulphate is then mixed and intimately incorporated with the equivalent, or a little more than two parts, of its own weight of finely-powdered fluor-spar, (fluoride of calcium.) The above mixture is placed in a cast-iron tubular retort and therein heated to incipient redness. As the result of a double reaction within the mixture, sulphate of lime and basic perfluoride of iron will be produced, both withstanding the temperature of the reaction. Steam is then admitted to run over the heated mass, and, though the sulphate of lime remains unaffected by the treatment, the perfluoride of iron is decomposed into fluorhydric acid, which passes off, while peroxide of iron remains mixed with the sulphate of lime. The vapors of fluorhydric acid, moist with some excess of steam, are admitted into a condenser lined with lead and kept constantly cool by a system of water-circulation outside of the walls of the condenser. The condensation of acid vapors is completed by a spray of water injected into the condenser by an atomizer so regulated that the proportion of water will be in the aggregate four times to that of the acid.

The bottom part of the condenser is furnished above the outflow of the products of the condensation with a perforated leaden plate upon which is heaped, ten or twelve inches thick, coarsely-ground quartz. Fluorhydric acid in the course of its infiltration through the silicious stratum at a low temperature and in presence of water follows all the stages of molecular metamorphosis to be ultimately converted entirely into hydrofluosilicic acid.

Extreme care must be taken in the selecton of fluor-spar to have it as free from silica as possible, because the fluosilicates are not decomposable by steam and every equivalent of silica keeps back from the reaction six equivalents of fluorhydric acid at pure loss to manufacture.

Care must be taken to perfect the preliminary oxidation of the protosulphate of iron in order to avoid dangerous accumulation of hydrogen within the apparatus and the consequent imperfect condensation of fluorhydric acid, owing to its dissemination through an incondensable atmosphere like hydrogen.

The fluoride of calcium alone is decomposable by steam; but the reaction to take place requires a temperature near to its melting-point, and fluoride will then cake, so that the steam will be prevented from coming in contact with the interior of its semi-fused mass to complete its decomposition into lime and fluorhydric acid.

The cost of the copperas, small already, is repaid by the residuary product of the manufacture, which will serve as an excellent red pigment for many purposes.

Apart from the question of economy this improved process for manufacturing hydrofluosilicic acid has its merits on the ground of safety, which to appreciate it is only necessary to imagine the gravity of accidents contingent on dealing with large bulk of semifluid acid mass in full ebullition, subject to overflow and to the dissemination of highly-suffocating and eminently-corrosive vapors through some accidental leakages or broken joints of the apparatus, such accidents being entirely beyond control in the old processes. In my process, the reaction being governed by the admission of steam, it is possible to stop by a check-valve at any moment.

What I claim as my invention, and desire to secure by Letters Patent, is—

1. As an improvement in the manufacture of hydrofluosilicic acid, the production of fluorhydric acid by mixing with sulphate of iron the equivalent portion of finely-powdered fluor-spar and subjecting the mixture to an incipient red heat in a closed vessel and causing steam to pass over the heated mixture, substantially as herein described.

2. The process of manufacturing hydrofluosilicic acid, consisting in first mixing with sulphate of iron the equivalent proportion of finely-powdered fluor-spar, next heating the said mixture to incipient redness in a close vessel, and causing steam to pass over it to decompose it and produce fluorhydric acid charged with vapor of water, and finally passing the said acid condensed with water through silica, substantially as herein set forth.

MARC. W. BEYLIKGY.

Witnesses:
FREDK. HAYNES,
L. M. EGBERT.